United States Patent
Finkler et al.

(10) Patent No.: US 8,063,628 B2
(45) Date of Patent: Nov. 22, 2011

(54) SENSOR DEVICE FOR AN ELECTRIC MACHINE

(75) Inventors: Roland Finkler, Erlangen (DE); Zeljko Jajtic, München (DE); Markus Knorr, Augsburg (DE)

(73) Assignee: Siemens Aktiengesellschaft, München (DE)

( * ) Notice: Subject to any disclaimer, the term of this patent is extended or adjusted under 35 U.S.C. 154(b) by 440 days.

(21) Appl. No.: 12/296,352

(22) PCT Filed: Feb. 21, 2007

(86) PCT No.: PCT/EP2007/051673
§ 371 (c)(1),
(2), (4) Date: Oct. 7, 2008

(87) PCT Pub. No.: WO2007/115857
PCT Pub. Date: Oct. 18, 2007

(65) Prior Publication Data
US 2009/0284253 A1 Nov. 19, 2009

(30) Foreign Application Priority Data
Apr. 7, 2006 (DE) .......................... 10 2006 016 503

(51) Int. Cl.
*G01B 7/14* (2006.01)
(52) U.S. Cl. ................................................ 324/207.24
(58) Field of Classification Search ........................ None
See application file for complete search history.

(56) References Cited

U.S. PATENT DOCUMENTS

| | | | |
|---|---|---|---|
| 3,206,738 A | 9/1965 | Wayman | |
| 3,457,482 A | 7/1969 | Sawyer | |
| 3,961,214 A | 6/1976 | Lokkart | |
| 4,075,551 A * | 2/1978 | Zabler | 324/207.16 |
| 4,935,676 A * | 6/1990 | Pelta | 318/135 |
| 5,880,541 A | 3/1999 | Hinds | |
| 6,650,106 B2 * | 11/2003 | Daalmans et al. | 324/207.16 |
| 6,690,133 B2 | 2/2004 | Knorr et al. | |
| 6,850,053 B2 * | 2/2005 | Daalmans et al. | 324/164 |

(Continued)

FOREIGN PATENT DOCUMENTS

DE 1217085 A 5/1966

(Continued)

OTHER PUBLICATIONS

Translation of DE 19941860 A1, Mar. 29, 2001.*

*Primary Examiner* — Jermele M Hollington
(74) *Attorney, Agent, or Firm* — Henry M. Feiereisen; Ursula B. Day

(57) ABSTRACT

The aim of the invention is to create an inexpensive sensor system for a movable electric machine in order to determine positions, the sensor signal featuring zero crossings. Said aim is achieved by a sensor device (1) comprising a U-shaped yoke (3) and a sensor (10) which is disposed in/on the yoke (3) to detect a magnetic variable, for example. Magnets (6 to 9) that are or can be inversely magnetized are arranged at a free end of the yoke (3). Opposite magnetic fluxes that can be detected by the sensor (10) can be generated in the yoke (3) in accordance with the position of the magnets (6 to 9) relative to one of the pole teeth (11, 12, 13) of a machine component. Approximately sinusoidal sensor signals can be generated therefrom without having to use several measuring sensors, e.g. in order to regulate a linear motor.

22 Claims, 4 Drawing Sheets

U.S. PATENT DOCUMENTS

| | | |
|---|---|---|
| 6,851,318 B2 | 2/2005 | Daalmans et al. |
| 6,873,152 B2 * | 3/2005 | Kliman et al. ............... 324/241 |
| 6,885,187 B2 | 4/2005 | Duenisch et al. |
| 6,906,513 B2 | 6/2005 | Duenisch et al. |
| 6,992,476 B2 | 1/2006 | Finkler |
| 7,271,509 B2 | 9/2007 | Hoppe et al. |
| 7,332,839 B2 | 2/2008 | Jajtic et al. |
| 7,746,064 B2 * | 6/2010 | Knorr et al. ............. 324/207.15 |
| 7,800,256 B2 | 9/2010 | Jajtic et al. |
| 2003/0071612 A1 * | 4/2003 | Daalmans et al. ....... 324/207.16 |
| 2003/0080728 A1 * | 5/2003 | Daalmans et al. ......... 324/207.2 |
| 2004/0124833 A1 * | 7/2004 | Kliman et al. ............... 324/241 |
| 2007/0222304 A1 * | 9/2007 | Jajtic et al. ...................... 310/12 |
| 2008/0066548 A1 * | 3/2008 | Jajtic et al. ................. 73/514.39 |
| 2009/0256428 A1 * | 10/2009 | Jajtic et al. ................. 310/12.25 |

FOREIGN PATENT DOCUMENTS

| | | |
|---|---|---|
| DE | 21 37 800 A1 | 5/1972 |
| DE | 32 18 298 A1 | 12/1982 |
| DE | 31 47 819 A1 | 6/1983 |
| DE | 690 21 240 T2 | 4/1996 |
| DE | 199 41 860 A1 | 3/2001 |
| DE | 101 03 478 A1 | 8/2001 |

\* cited by examiner

SENSOR DEVICE FOR AN ELECTRIC MACHINE

BACKGROUND OF THE INVENTION

The present invention relates to a sensor device for an electric machine, which has a machine component provided with pole teeth, for the purpose of detecting a movement relative to the machine component. The sensor device is equipped with a U-shaped or E-shaped yoke and a sensor, which is arranged in/on the yoke for the purpose of detecting a magnetic variable.

Sensor devices of this type can be used for any desired electric machines, such as DC motors, AC motors and three-phase motors, for example. In this case, they can also be used both in rotary motors and in linear motors. Specifically, in order to come close to a specific rotary angle in the case of rotary motors or specific path lengths in the case of linear motors, it is necessary to measure the present rotary angle or the present path length. In this case, the measurement is intended to take place as precisely as possible in order that the corresponding rotary angle or the corresponding path length can be approached precisely and quickly by means of a suitable regulating device. Knowledge of the position is also necessary in the case of synchronous machines for the correct energization of the motor.

Generally, optical measurement systems are used for position determination for linear motors. Disadvantages of an optical measurement are, however, that this is expensive to implement and that the optical measurement is very easily impaired or made impossible by contamination in the linear motor or in its environment, with the result that failure of the regulating device often occurs.

SUMMARY OF THE INVENTION

The object of the present invention consists in proposing a cost-effective sensor system for a moving electric machine, in which a signal with a zero crossing is provided depending on the position.

According to the invention, this object is achieved by a sensor device for an electric machine, which has a machine component provided with pole teeth for the purpose of detecting a position or a movement relative to the machine component with a U-shaped yoke or yoke section and a sensor, which is arranged in/on the yoke section, for the purpose of detecting a magnetic variable, two oppositely directed or directable magnets being arranged on a free end of the yoke section in order to produce oppositely directed magnetic fluxes in the yoke section which can be detected by the sensor, depending on the position of the magnets with respect to one of the pole teeth of the machine component. The term "yoke section" can in this document also be understood as being an entire yoke.

The invention therefore provides that the direction of the magnetic flux in the yoke changes within the yoke or yoke section during displacement of the sensor device with respect to the machine component. Therefore, a signal with a zero crossing can be obtained, from which the position can be determined more precisely. A sine/cosine signal pair which may be obtained is in addition suitable for a conventional sine/cosine sensor evaluation. Such a signal pair can be produced, for example, with the aid of two sensor devices according to the invention, which are offset in the movement direction by a quarter of a pole pair length or an electrical period of the secondary part.

The sensor for detecting the magnetic variable may be, for example, a Hall sensor or a measuring coil. These sensors can be used to determine the flux or the change in flux in the yoke sufficiently accurately.

In the case of a Hall sensor as the sensor, the magnets on the free end of the yoke or yoke section may be permanent magnets. It is therefore not necessary to electrically produce the magnetic flux for the position determination. In the case of a measuring coil as the sensor, the magnets on the free end of the yoke or yoke section may be field coils through which alternating current is flowing. AC voltage(s) is/are induced in the measuring coil(s), and this voltage or these voltages are advantageously first demodulated in a suitable manner.

Preferably, in each case two oppositely directed or directable magnets are arranged on the two free ends of the U-shaped yoke section. The magnetic flux in the yoke is thus correspondingly increased.

A further limb can be integrally formed on the yoke section, with the result that an E-shaped yoke is produced. In this way, the symmetry of the signal can be increased. In this case, the sensor is preferably arranged in/on the central limb of the E-shaped yoke or yoke section.

Furthermore, the sensor device according to the invention can also be used for a transverse-flux machine by virtue of the U-shaped yoke section being arranged transversely with respect to the movement direction. The magnets on the free ends of the yoke section need to be arranged one behind the other in the movement direction of the sensor device in order that the direction of the magnetic flux in the yoke section or in the sensor air gap changes when the sensor device is displaced (in similar fashion to in the case of a longitudinal-flux arrangement of the sensor device illustrated in FIG. 1).

In addition, in order to achieve the abovementioned object, the invention provides a sensor device for an electric machine, which has a machine component provided with pole teeth, for the purpose of detecting a position or a movement relative to the machine component, with a U-shaped yoke section, a magnet device, which is arranged in or on the yoke section, for the purpose of producing a magnetic flux in the yoke section, and a sensor, which is arranged in/on the yoke section, for the purpose of detecting a magnetic variable, the sensor having two sensor elements on a free end of the yoke section, which sensor elements bring about voltages in different directions in the two sensor elements given the same magnetic flux through the yoke section in order to produce correspondingly high and directed voltages on the sensor elements, depending on the position of the sensor elements with respect to one of the pole teeth of the machine component.

In this embodiment, the ratio of the magnetic fluxes in the two magnet coils on one of the free ends of the yoke changes. Owing to the differently directed voltages in the sensor elements, a correspondingly precise position signal, possibly with a zero crossing, can be obtained.

In this case, too, the two sensor elements can be in the form of Hall sensors or measuring coils. They are cost-effective to produce and nevertheless sufficiently accurate.

In this configuration, a further limb can also be integrally formed on the yoke section, with the result that an E-shaped yoke is produced and, in addition, likewise two sensor elements of the mentioned type are arranged on the free end of the further limb. With this arrangement it is possible to obtain two signals which are phase-shifted through 90°, with a zero crossing.

In this embodiment, too, it is advantageous if in each case two sensor elements are arranged on the two freely ending limbs of the yoke section, which sensor elements produce the correspondingly directed voltages. In this case, relatively high voltages occur in particular, for example, as a result of the sensor elements being connected in series.

The invention also provides a sensor device for an electric machine, which has a machine component provided with pole teeth, for the purpose of detecting a position or a movement relative to the machine component, with an E-shaped yoke, which is split into two yoke parts symmetrically and transversely with respect to the movement direction, a sensor, which is arranged between the two yoke parts, and a directed or directable magnet which is arranged on the ends of the two yoke parts.

This embodiment makes it possible to implement the principle according to the invention using only a single magnet. Only a single magnet tolerance is therefore involved in the measurement.

In particular it is advantageous to use the present invention in the case of a linear motor, the abovementioned machine component corresponding to the secondary part and the sensor device being fastened on the primary part or being part of the primary part. Position regulation of the linear motor can thus be provided in a cost-effective manner.

BRIEF DESCRIPTION OF THE DRAWING

The present invention will now be explained in more detail with reference to the attached drawings, in which.

DETAILED DESCRIPTION OF PREFERRED EMBODIMENTS

The exemplary embodiments outlined in more detail below represent preferred embodiments of the present invention. The exemplary embodiments relate to linear motors, but can similarly also be transferred to rotary motors, in particular torque motors.

Figure 1:
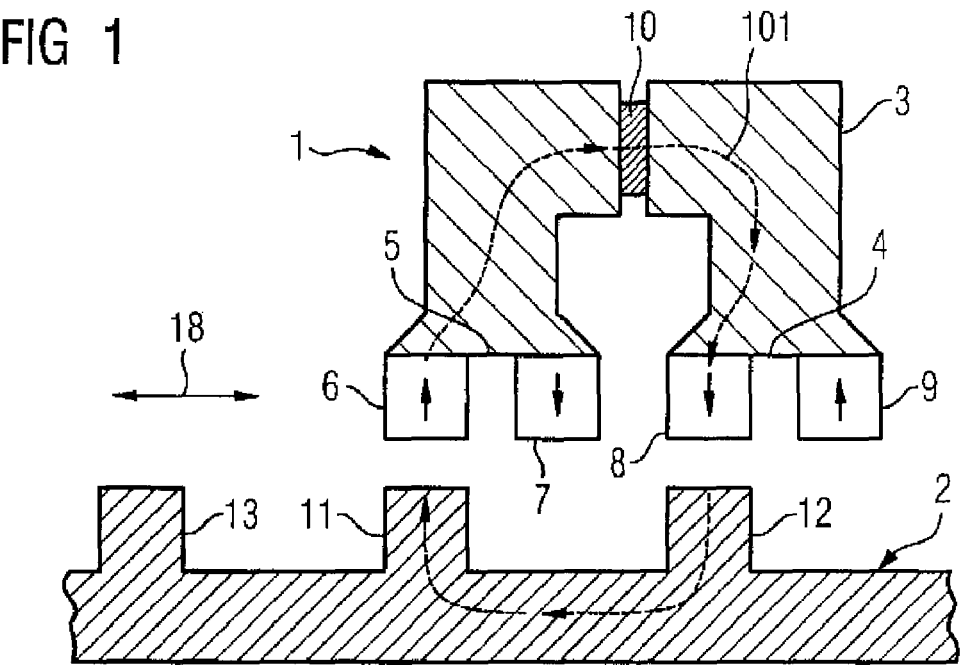
FIG. 1 shows a longitudinal section through a sensor device according to the invention in accordance with a first embodiment.

The longitudinal section reproduced in FIG. 1 through a part of a linear motor shows a sampling head 1 or a section of a primary part and a secondary part 2. The primary part 1 has a yoke 3, which is substantially U-shaped. Permanent magnets 6, 7, 8 and 9 are arranged as pole teeth on the free ends 4 and 5 of the yoke 3. All of the permanent magnets 6 to 9 are magnetized in the direction from the sampling head 1 to the secondary part 2, or vice versa. In each case two permanent magnets 6, 7 and 8, 9, respectively, which are magnetized parallel, but in opposition, are located on each of the free ends 4, 5.

In the yoke 3, a Hall sensor 10 is located between the two free ends 4 and 5. The Hall sensor 10 may split the yoke 3 into two halves.

Here, the secondary part 2 comprises a toothed rack with the teeth 11, 12 and 13. The teeth of the secondary part 2 have the same spacing as the teeth 6 and 8 or 7 and 9 of the sampling head 1.

The yoke 3 and the secondary part 2 are made from a ferromagnetic material. They are preferably laminated.

In the position illustrated in FIG. 1 in which the permanent magnets 6 and 8 of the primary part are positioned over the teeth 11 and 12 of the secondary part 2, a magnetic field or magnetic flux 101 passes through the Hall sensor 10 from "left to right". If the sampling head 1, i.e. the sensor device, now moves further to the left in the movement direction 18, the magnetic field through the Hall sensor 10 decreases to an ever greater extent, until it becomes zero. During the further movement, the direction of the magnetic field changes and ultimately assumes a maximum value. This is the case when the sampling head is positioned in such a way that the permanent magnets 7 and 9 are positioned over the teeth 11 and 12 of the secondary part. During a further movement to the left, the magnetic field is reduced again, changes direction and ultimately assumes a maximum value again if the permanent magnets 6 and 8 are positioned over the teeth 13 and 11. During this movement through a tooth pitch, precisely one sensor signal period with zero crossings is therefore passed through.

Figure 2:
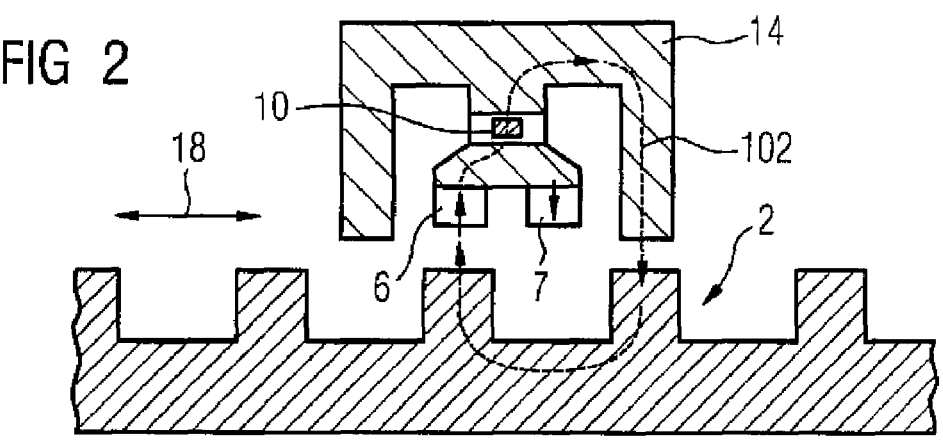
FIG. 2 shows a longitudinal section through a sensor device in accordance with a second embodiment with an E-shaped yoke.

FIG. 2 shows a developed embodiment of the exemplary embodiment in FIG. 1. In the development, a plurality of development steps are carried out which can also be carried out individually or in combinations of two.

The first development step consists in the fact that permanent magnets 6, 7 are arranged only on a single free end of the yoke. Since the permanent magnet 6 produces an upwardly directed magnetic field in FIG. 2 and is arranged over a pole tooth of the secondary part 2, the flux 102 illustrated through the Hall sensor 10 results. If, on the other hand, the permanent magnet 7, whose magnetization is directed downwards, is positioned over a pole tooth of the secondary part 2, the magnetic flux through the Hall sensor 10 is directed in the opposite direction.

A second development step consists in the fact that the Hall sensor is not arranged in the connecting limb between the two freely ending limbs of the U-shaped yoke, but in one of the freely ending limbs.

A third development step consists in the fact that a third freely ending limb is attached to the yoke. In the example in FIG. 2, an integral, E-shaped yoke 14 thus results. The flux which is critical for the movement or position determination passes substantially only through a U-shaped yoke section, however, unless the position sensor is located in a symmetrical position with respect to the pole teeth of the secondary part 2.

Figure 3:
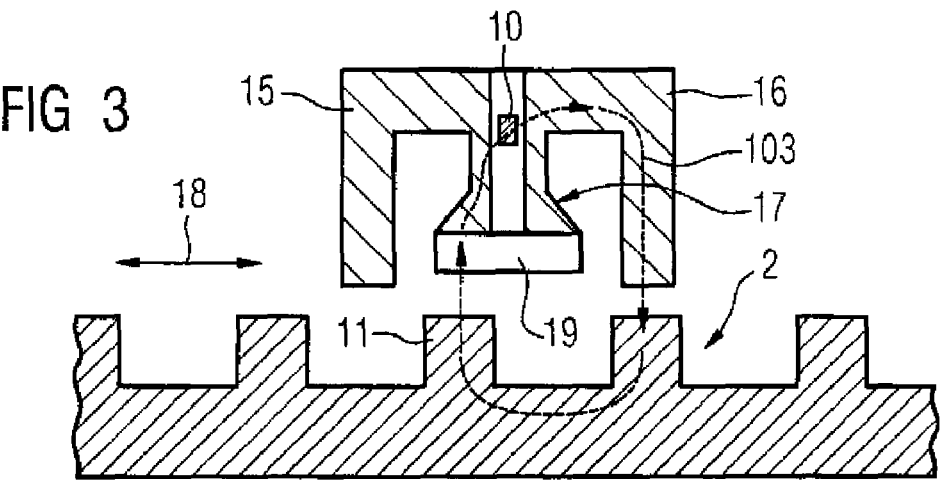
FIG. 3 shows a longitudinal section through a sensor device in accordance with a third embodiment with a single permanent magnet.

FIG. 3 shows a further embodiment of the sensor device according to the invention with an E-shaped yoke. The yoke is split symmetrically into two yoke halves 15 and 16. An air gap is located between these yoke halves, in which air gap the Hall sensor 10 is arranged. The central limb 17 therefore comprises two parallel limb halves, which are separated by the air gap in which the Hall sensor 10 is located. A single permanent magnet 19 is located on the free end of the two limb halves. In the example in FIG. 3, this permanent magnet 19 is upwardly magnetized, which results in the flux 103 illustrated. Since the left-hand half of the limb 17 is located over the pole tooth 11 of the secondary part 2, the magnetic flux runs upwards in the left-hand limb half and from left to right through the Hall sensor 10. If the right-hand half of the central limb 17 is located over the pole tooth 11 or another pole tooth, the magnetic flux runs substantially in the right-hand half and passes through the Hall sensor 10 from right to left. In this case, a measurement voltage with the opposite mathematical sign results. The advantage of this embodiment consists in the fact that only one permanent magnet needs to be provided for the sensor device.

Figure 4:
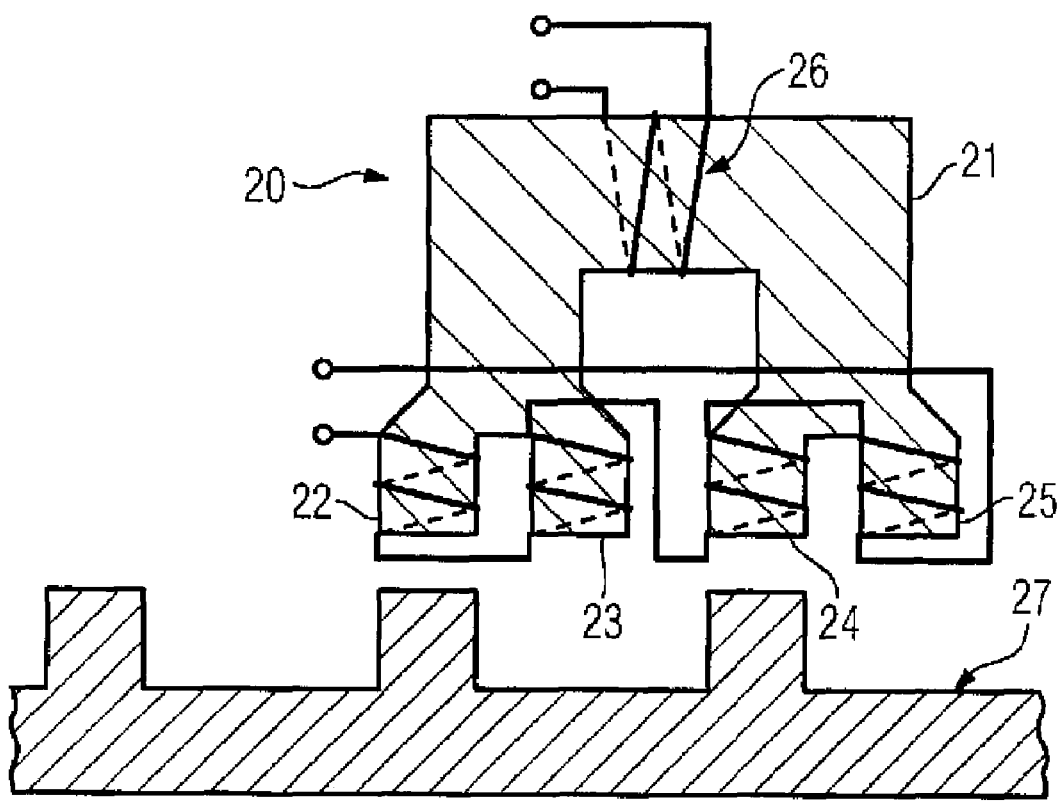
FIG. 4 shows a longitudinal section through a sensor device according to the invention in accordance with a fourth embodiment.

The measurement principle according to the invention can also be transferred to an inductive measuring head in accordance with the reluctance resolver principle by virtue of the permanent magnets and the Hall sensor being replaced by corresponding coils. Accordingly, as shown in FIG. 4, the alternative sensor device 20 is provided with field coils 22, 23, 24, 25 on the free ends of its yoke 21. Since the electromagnets thus formed on the free ends of the yoke 21 need to have different magnetization directions, they are electrically wired correspondingly. In the present example, the field coils 22 to 25 are connected in series. In order to achieve the opposite magnetization directions, given identical winding senses of the coils 22 to 25 said coils are connected in series in such a way that the lower connection of the coil 22 is connected to the lower connection of the coil 23, the upper connection of the coil 23 is connected to the lower connection of the coil 24 and the upper connection of the coil 24 is connected to the upper connection of the coil 25. An excitation signal is applied to the (therefore still free) upper connection of the coil 22 and the (therefore still free) lower connection of the coil 25.

A measuring coil 26 is wound around the connecting limb which connects the two limbs to the free ends of the yoke 21. At said measuring coil 26, a voltage can be tapped off which is produced by the magnetic flux flowing in the yoke 21.

The secondary part 27 of the linear drive has the same shape as that of the secondary part 2 in FIG. 1. The geometry of the primary part or of the sensor device 20 is likewise the same as that of the part 1 in FIG. 1.

The way in which the sensor device shown in FIG. 4 functions corresponds in principle to the way in which the device in FIG. 1 functions. The permanent magnets are in this case only replaced by field coils and the Hall sensor by a measuring coil. Since the electromagnets 22 to 25 are operated on alternating current, the equivalence with the above described exemplary embodiment shown in FIG. 1 only applies in correspondingly small time windows. This means that, in this small time window, the direction of the magnetic flux in the yoke depends directly on the position of the magnet coils with respect to the pole teeth of the machine component.

The coils used in the exemplary embodiment in FIG. 2 can also be operated in reverse fashion. Thus, the coil 26 can be used as the field coil and the coils 22 to 25 on the free ends of the yoke 21 can be used as measuring coils. In this case, the measurement signals of the individual coils add up to a resultant measurement signal. This measurement signal also achieves its maximum values if the teeth are positioned over those of the secondary part 27. In between there are zero crossings as in the exemplary embodiment in FIG. 1.

As indicated above, an arrangement with Hall sensors and permanent magnets can be converted into an arrangement in accordance with the reluctance resolver principle. Measuring and field coils are likewise interchangeable. In general, this variation of the arrangements can be described by the diagram in FIG. 5. On the basis of an arrangement A1 with a Hall sensor and permanent magnets as shown in FIG. 1, interchanging the Hall sensor and the permanent magnets can result in the arrangement A2, in which the Hall sensors are arranged on the free ends of the yoke and a permanent magnet is located in the yoke. If the Hall sensors are replaced by measuring coils and the permanent magnet by a field coil, the arrangement A3 is arrived at from this arrangement A2. If, starting from the arrangement A3, the measuring coils and field coils are interchanged, an arrangement A4 in accordance with the reluctance resolver principle is obtained, as is reproduced by way of example in FIG. 4 with field coils 22 to 25 and the measuring coil 26.

If, starting from this arrangement A4, the measuring coils are replaced by a Hall sensor and the field coils are replaced by permanent magnets, the arrangement A1 is again obtained. The replacement of the components can of course also be carried out in reverse sequence. The term "Hall sensor" in this case generally represents a (steady-state) magnetic field sensor and the term "permanent magnet" represents a device for producing a temporally constant magnetic field. If, when replacing and exchanging components, arrangements with a plurality of Hall sensors are produced, the output signals thereof need to be added or subtracted correspondingly.

Figure 6:
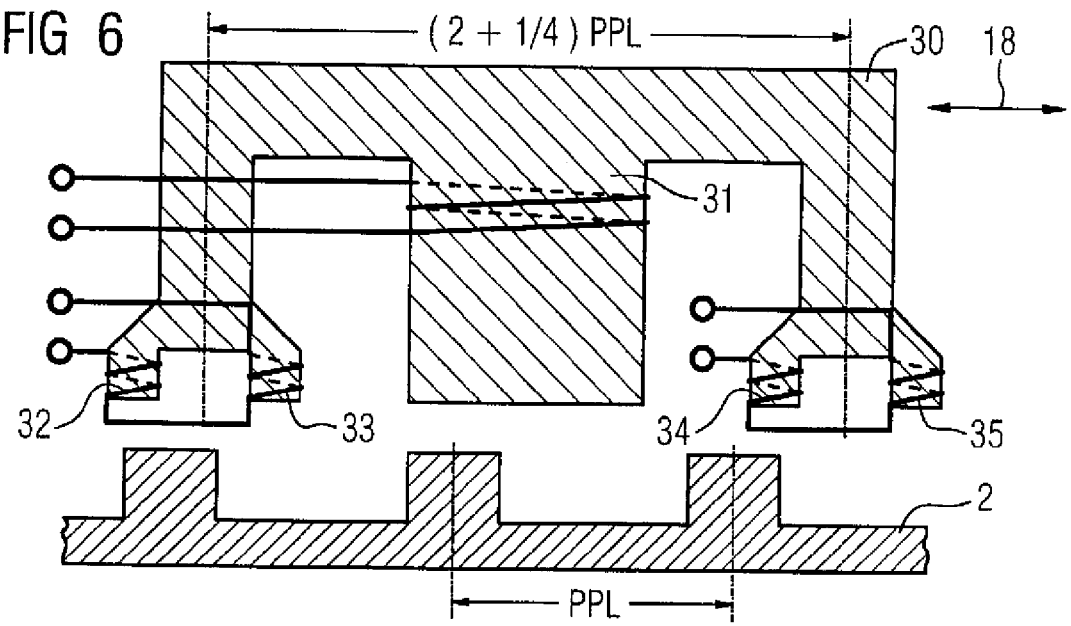
FIG. 6 shows a longitudinal section through a fifth embodiment of a sensor device according to the invention.

A further exemplary embodiment of a sensor device according to the invention is illustrated in FIG. 6. With this sensor device it is possible to generate not only one but two signals which are phase-shifted through 90°, each with a zero crossing. For this purpose, a field coil 31 is wound around the central limb of an E-shaped yoke 30. In order to produce a cosine signal, two measuring coils 32 and 33 are located on the free end of the left-hand limb of the yoke 30. In the same way, in order to produce a sine signal, two measuring coils 34 and 35 are located on the end of the right-hand limb of the yoke 30. The measuring coils 32 and 33 are connected in series with the same winding sense in such a way that the lower connections of the two coils are connected to one another. The same applies to the measuring coils 34 and 35.

In order to optimize the measurement signals, the dimensions of the yoke 30 are matched to the pole pair length PPL or electrical period of the secondary part 2. Accordingly, the mid distance between the outer limbs of the yoke 30 is 2.25 PPL. Thus, with a single head, a sine signal and a cosine signal, each with a zero crossing, can be obtained for position determination.

Figure 5:
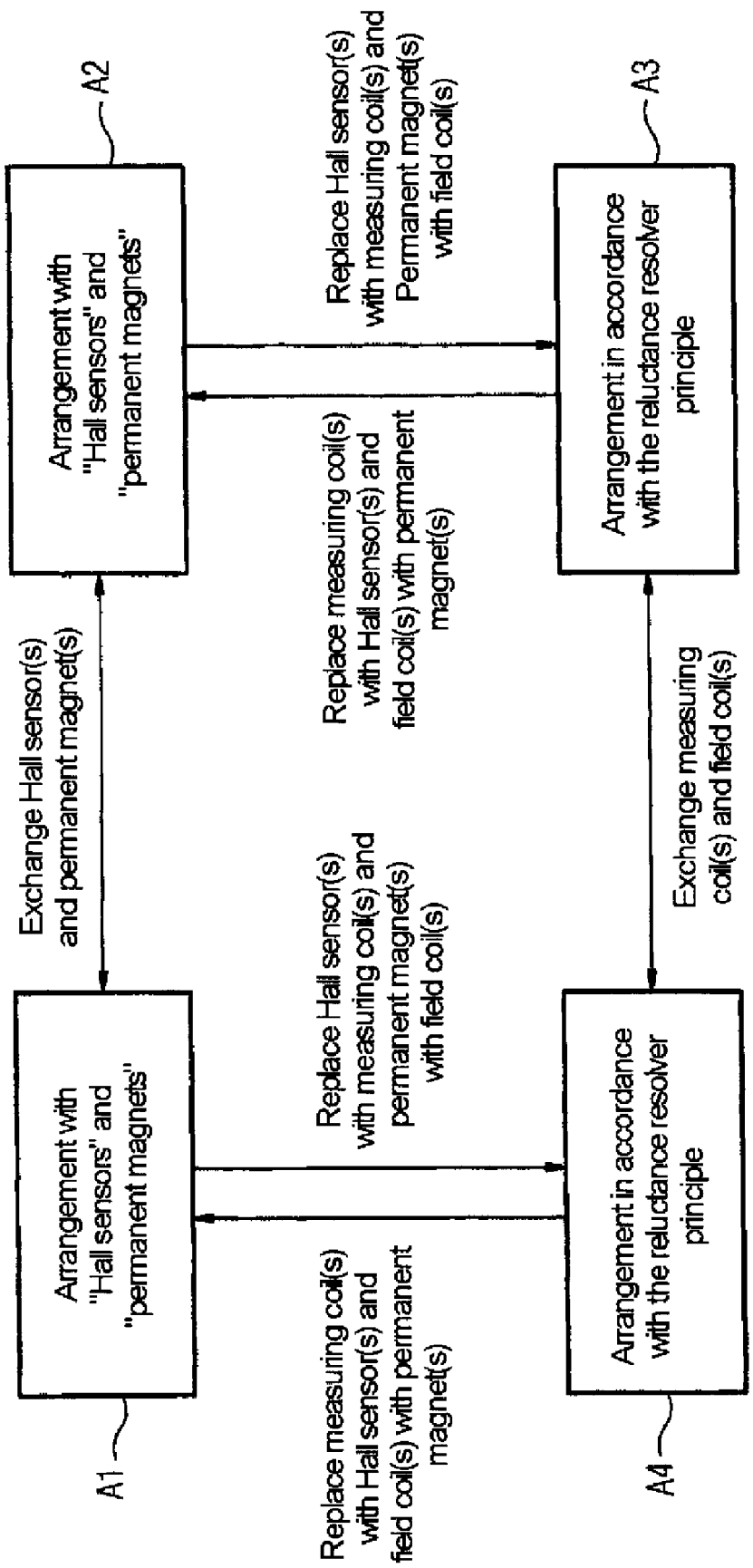
FIG. 5 shows a transformation chart for arrangements according to the invention of sensor devices.

The embodiment of the sensor device according to the invention illustrated in FIG. 6 can also be developed in accordance with the principle in FIG. 5. However, only the transformations in the vertical direction can be carried out here because in this case two measurement signals are produced from one excitation.

Figure 7:
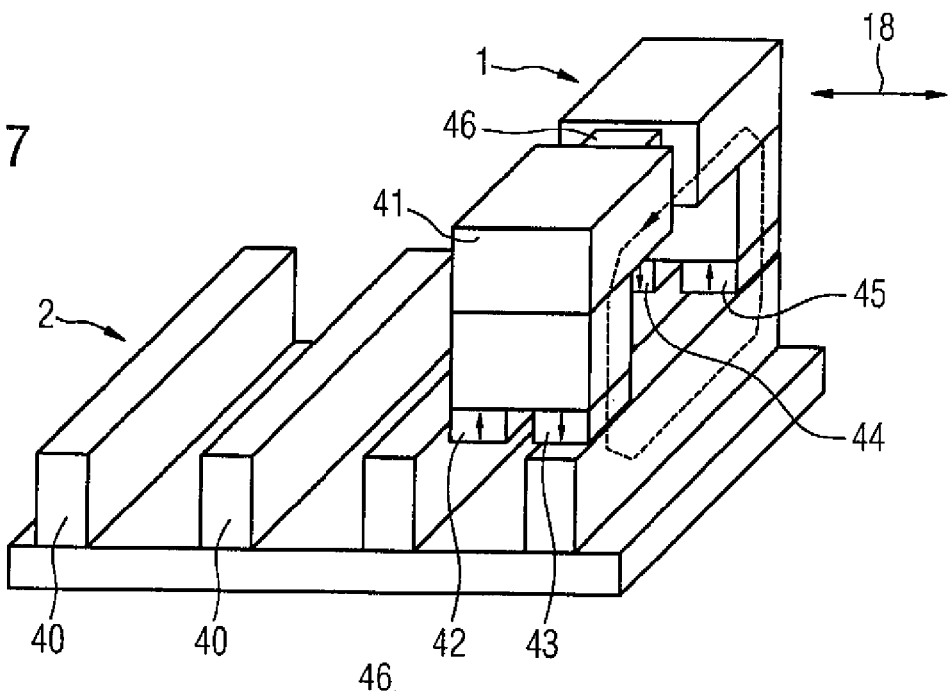
FIG. 7 shows a 3D view of a sixth embodiment.
Figure 8:
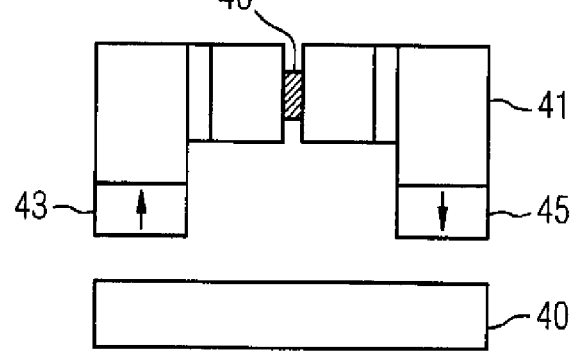
FIG. 8 shows a front view of the embodiment in FIG. 7.

The arrangements described in connection with FIGS. 1 to 6 are suitable for secondary parts of so-called longitudinal-flux machines, i.e. for machines in which the flux in the secondary part produced by the motor closes in the movement direction. The secondary part of such longitudinal-flux machines is characterized by the fact that the individual teeth of the secondary part are magnetically conductively connected to one another. In the case of transverse-flux machines, on the other hand, in which the flux produced by the motor closes transversely with respect to the movement direction and therefore within in each case one tooth, the teeth 40 accordingly do not need to be magnetically conductively connected to one another. FIG. 7 shows a plan view of an arrangement for such a secondary part comprising teeth 40 which are magnetically isolated from one another. FIG. 8 shows a corresponding front view. The yoke 41 or the yoke section is substantially U-shaped in this case, too. In each case two permanent magnets 42, 43 and 44, 45 are located on the free ends of the yoke 41. The magnetization directions of the magnets 42 and 43 are likewise oppositely directed, as are the magnetization directions of the magnets 44 and 45. A Hall sensor 46 in the center of the yoke 41 registers the magnetic flux. If the yoke 41 with its magnets is displaced in the displacement direction 15 over the pole teeth 40 of the secondary part, the flux direction through the Hall sensor 46 is also changed here.

As a result of a corresponding design of the sampling head or the sensor device 1, 20 and possibly of the secondary part 2, 27, the sinusoidal nature of the sensor signal can be optimized. In this case, not only the configuration of the pole teeth, but also their spacing is significant.

In order to implement the invention it is sufficient if permanent magnets or coils are arranged only on one free end of a yoke 3, 21. The other free end of the yoke 3, 21 does not necessarily also need to be equipped with magnets. In this embodiment, however, the quality of the sensor signal is decreased.

Advantageously, the configuration of the sensor device according to the invention results in a reduction in the complexity involved in comparison with the prior art. In particular, arrangements with a single sensor are possible, in which, nevertheless, a sensor signal with a zero crossing can be provided.

What is claimed is:

1. A sensor device for detecting a position or a movement relative to a machine component of an electric machine having pole teeth, the sensor comprising:
a U-shaped yoke section having opposing free ends, and
a sensor arranged in or on the yoke section for measuring a magnetic variable, and
two magnets having opposite polarity arranged on each of the opposing free ends of the yoke section, with a magnet of one polarity disposed on one end of the yoke section in cooperation with a magnet of opposite polarity on the other end of the yoke section producing in the yoke section a magnetic flux depending on a position of the two magnets in relation to an opposing pole tooth, with a flux direction in the yoke section depending on the polarity of the two cooperating magnets that oppose the opposing pole teeth.

2. The sensor device of claim 1, wherein the sensor comprises a Hall sensor.

3. The sensor device of claim 1, wherein the sensor comprises a measuring coil wound around the yoke section.

4. The sensor device of claim 1, wherein the magnets arranged on the free end of the yoke section are permanent magnets.

5. A sensor device for detecting a position or a movement relative to a machine component of an electric machine having pole teeth, the sensor comprising:
a U-shaped yoke section having opposing free ends and an additional center limb integrally formed on the yoke section, thereby producing an E-shaped yoke section,
a sensor arranged in or on the yoke section for measuring a magnetic variable, and
two magnets having opposite polarity arranged on the additional center limb of the yoke section and producing in the yoke section a magnetic flux depending on a position of the two magnets in relation to an opposing pole tooth, with a flux direction in the yoke section depending on the polarity of the magnet that opposes the pole tooth.

6. The sensor device of claim 5, wherein the sensor is arranged in or on the center limb of the E-shaped yoke section.

7. The sensor device of claim 1, wherein the two magnets are arranged consecutively in a movement direction of the sensor device relative to the machine component.

8. A sensor device for detecting a position or a movement relative to a machine component of an electric machine having pole teeth, the sensor comprising:
a U-shaped yoke section having opposing free ends, and
a magnet device arranged in or on the yoke section for producing in the yoke section a magnetic flux having a flux direction, and
a sensor having two sensor elements arranged on each of the opposing free ends of the yoke section for measuring a magnetic variable,
wherein a sensor element disposed on one end of the yoke section in cooperation with a sensor element disposed on the other end of the yoke section produce for a given magnetic flux direction in the yoke section voltages of different polarity in the cooperating sensor elements, with a magnitude of the produced voltages depending on a position of the cooperating sensor elements in relation to an opposing pole tooth.

9. The sensor device of claim 8, the two sensor elements comprise Hall sensors.

10. The sensor device of claim 8, the two sensor elements comprise measuring coils.

11. The sensor device of claim 8, wherein the U-shaped yoke section comprises an additional center limb integrally formed on the yoke section, thereby producing an E-shaped yoke section, with the magnet device being arranged on the free end of the additional center limb.

12. The sensor device of claim 8, wherein two sensor elements are arranged on each of the free ends of the yoke section.

13. A sensor device for detecting a position or a movement relative to a machine component of an electric machine having pole teeth, the sensor comprising:
an E-shaped yoke having center limb and being symmetrically split along the center limb into two yoke parts transversely to a movement direction, with an air gap separating the two yoke parts,
a sensor arranged in the air gap of the center limb for measuring a magnetic variable, and
a magnet bridging free ends of the two yoke parts of the center limb.

14. The sensor device of claim 13, wherein the sensor comprises a Hall sensor.

15. The sensor device of claim 13, wherein the sensor comprises a measuring coil wound around the yoke section.

16. The sensor device of claim 13, wherein the magnet bridging the free ends is a permanent magnet.

17. An electric machine comprising a sensor device for detecting a position or a movement relative to a machine component of the electric machine having pole teeth, the sensor comprising:
a U-shaped yoke section having opposing free ends, and
a sensor arranged in or on the yoke section for measuring a magnetic variable, and
two magnets having opposite polarity arranged on each of the opposing free ends of the yoke section, with a magnet of one polarity disposed on one end of the yoke section in cooperation with a magnet of opposite polarity on the other end of the yoke section producing in the yoke section a magnetic flux depending on a position of the two magnets in relation to an opposing pole tooth, with a flux direction in the yoke section depending on the polarity of the two cooperating magnets that oppose the opposing pole teeth.

18. The electric machine of claim 17 wherein the electric machine is implemented as a linear motor having a primary part and a secondary machine part, with the machine component having the pole teeth forming a secondary machine part and the sensor device being fastened to or being a part of the primary part.

19. An electric machine comprising a sensor device for detecting a position or a movement relative to a machine component of an electric machine having pole teeth, the sensor comprising:
   a U-shaped yoke section having opposing free ends, and
   a magnet device arranged in or on the yoke section for producing in the yoke section a magnetic flux having a flux direction, and
   a sensor having two sensor elements arranged on each of the opposing free ends of the yoke section for measuring a magnetic variable,
   wherein a sensor element disposed on one end of the yoke section in cooperation with a sensor element disposed on the other end of the yoke section produce for a given magnetic flux direction in the yoke section voltages of different polarity in the cooperating sensor elements, with a magnitude of the produced voltages depending on a position of the cooperating sensor elements in relation to an opposing pole tooth.

20. The electric machine of claim 19 wherein the electric machine is implemented as a linear motor having a primary part and a secondary machine part, with the machine component having the pole teeth forming a secondary machine part and the sensor device being fastened to or being a part of the primary part.

21. An electric machine comprising a sensor device for detecting a position or a movement relative to a machine component of an electric machine having pole teeth, the sensor comprising:
   an E-shaped yoke having center limb and being symmetrically split along the center limb into two yoke parts transversely to a movement direction, with an air gap separating the two yoke parts,
   a sensor arranged in the air gap of the center limb for measuring a magnetic variable, and
   a magnet bridging free ends of the two yoke parts of the center limb.

22. The electric machine of claim 21 wherein the electric machine is implemented as a linear motor having a primary part and a secondary machine part, with the machine component having the pole teeth forming a secondary machine part and the sensor device being fastened to or being a part of the primary part.

* * * * *